United States Patent [19]
Cheng et al.

[11] Patent Number: 6,075,687
[45] Date of Patent: Jun. 13, 2000

[54] MONITOR X-RAY PROTECTION DEVICE

[75] Inventors: Kuei-Pi Cheng; Gary Hsieh, both of Taipei, Taiwan

[73] Assignee: Mag Technology Co., Ltd., Taipei, Taiwan

[21] Appl. No.: 09/189,726

[22] Filed: Nov. 10, 1998

[51] Int. Cl.[7] ...................................................... H02H 3/20
[52] U.S. Cl. ............................ 361/91.1; 361/86; 361/90; 361/91.3
[58] Field of Search ........................... 361/90, 91.1, 91.2, 361/91.3, 91.5, 91.6, 86

[56] References Cited

U.S. PATENT DOCUMENTS

| | | | |
|---|---|---|---|
| 5,430,596 | 7/1995 | Hamaguchi et al. | 361/86 |
| 5,561,578 | 10/1996 | Shimoyanagida | 361/91 |

*Primary Examiner*—Michael J. Sherry

[57] ABSTRACT

An X-ray protection device adapted to be incorporated into a monitor that includes a cathode ray tube actuated by a high voltage from a transformer powered by a low voltage power supply. The X-ray protection device includes a circuit which is coupled to a low voltage output of the transformer to obtain a signal from the transformer to represent the high voltage applied by the transformer to the cathode ray tube. The signal is then voltage divided and analog-to-digital-converted to supply a digital signal to a microprocessor which receives and processes the digital signal to give a comparison result by comparing the digital signal with predetermined upper and lower bounds and a triggering threshold and a switching circuit which is connected to the microprocessor to be actuated by the microprocessor in response to the comparison result to cut off the power supplied to the transformer in order to shut down the monitor if the digital signal is not between the upper and lower bounds or is greater than the threshold for a time period greater than a predetermined time interval.

8 Claims, 4 Drawing Sheets

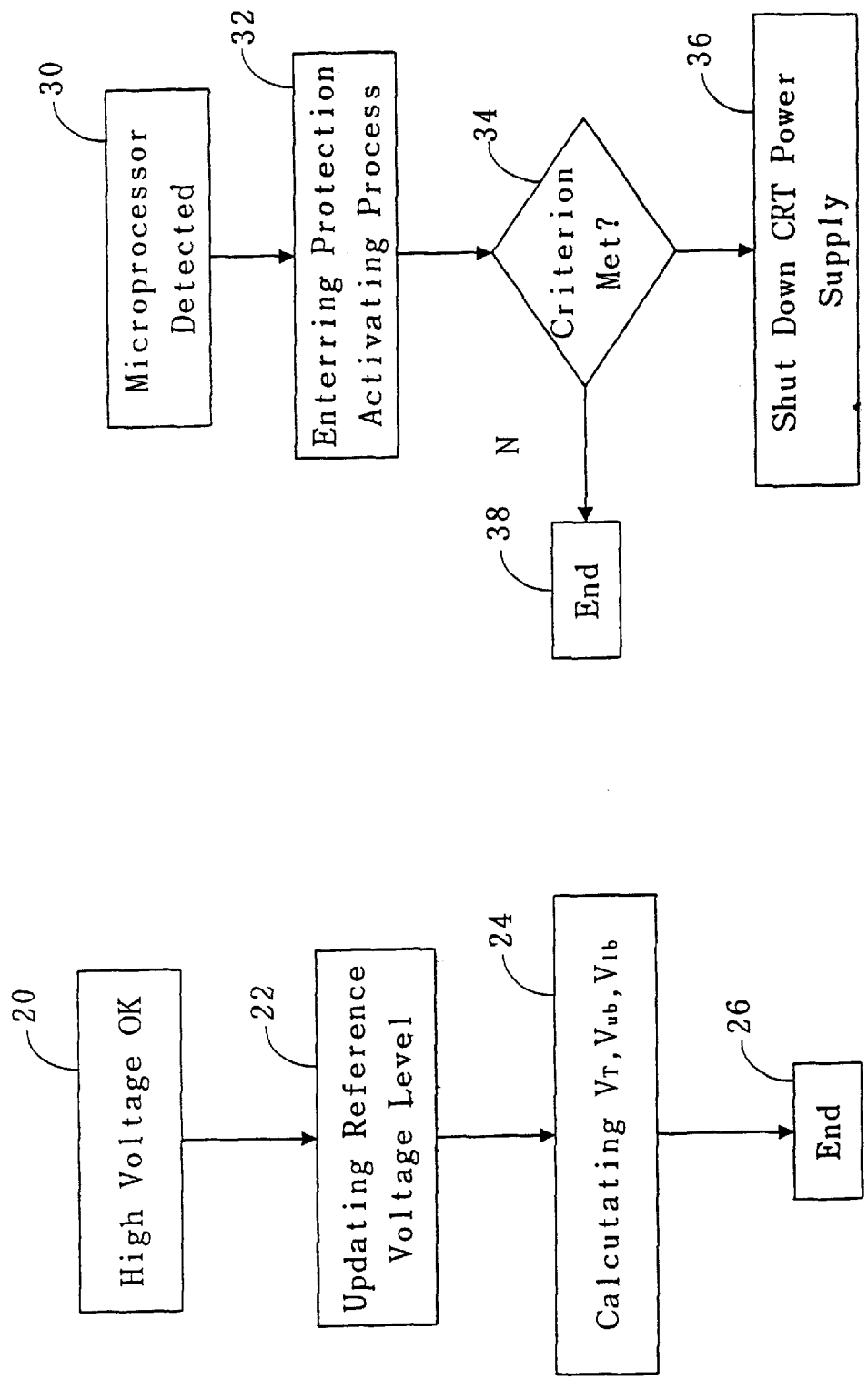

MONITOR X-RAY PROTECTION DEVICE

FIELD OF THE INVENTION

The present invention relates generally to an X-ray protection device to be incorporated in a computer monitor to shut down the monitor once the X-ray radiation from the monitor exceeds a predetermined threshold and in particular to a monitor X-ray protection device which controls the X-ray radiation in a more effective way.

BACKGROUND OF THE INVENTION

Computer monitors are a very important output device for computer systems. Nowadays, most of the monitors are a CRT (cathode ray tube) based device in which a high voltage is generated by means of a high voltage transformer to drive electrons toward the screen for the generation of light spot on the screen. Normally, the high voltage that is generated by the transformer to be applied to the CRT is about 25 KV. The high voltage may cause damage to the electronic elements of the CRT circuit over time so that aging and deterioration of the electronic elements result in increase of the output voltage level of the transformer gradually or accidentally to a higher level.

Since the CRT generates X-ray radiation during its operation and the X-ray radiation so generated is dependent upon the high voltage applied to the CRT. FIG. 1 of the attached drawings shows a plot of the X-ray radiation generated by the CRT versus the voltage applied to the CRT. As can be seen from FIG. 1, the higher the voltage is, the stronger the X-ray will be generated by the CRT. To avoid strong radiation of X-ray during the operation of the monitor, an X-ray protection device is usually incorporated in the monitor which will be activated to shut down the power supply to the CRT when the high voltage applied to the CRT exceeds a threshold value which is usually taken as 27 KV in the monitor industry. This ensures that no excessive X-ray radiation may be generated.

FIG. 2 shows an example of the conventional X-ray protection device, wherein an AC voltage source 90 supplies a low voltage signal to input terminals of a transformer 10 which generates a high voltage at high voltage output terminals thereof. A voltage signal is taken from low voltage output terminals of the transformer 10 which is processed by means of a voltage division circuit comprised of resistors R1 and R2 and the divided voltage is applied to a Zener diode D for triggering a silicon control rectifier SCR which serves as a switch and once triggered cuts off the supply of the low voltage signal from the AC voltage source 90 to the transformer 10. A variable resistor VR is incorporated in the voltage division circuit so that the divided voltage applied to the Zener diode to control the switch SCR may be manually adjusted.

To ensure that the X-ray protection device of each monitor works, severe regulation is set up to be followed by the monitor manufacturers. FIG. 3 shows the conventional way of manually testing the X-ray protection device in the monitor manufacturing line. The process is started by setting the voltage applied to the CRT which is usually 25 KV as mentioned above, in other words, aligning the high voltage applied to the CRT to the CRT rating voltage (step a) and then manually stepping up the voltage to a level greater than the threshold to activate the X-ray protection device (step b). The voltage level that is applied to the CRT for test purpose is usually 30 KV or other suitable value. This voltage activates the X-ray protection device to shut down the power supply to the monitor CRT, if the X-ray protection device does not malfunction or break down, otherwise a calibration or repairing step (step c) has to be taken to fix the X-ray protection device. Thereafter, other manufacturing process, if needed, is carried out (step d).

Such a conventional design of the monitor X-ray protection device has some drawbacks, such as:

(1) Since the X-ray protection device is manually adjusted, error is inevitable.

(2) Since in testing the X-ray protection, the manufacturing line operator has to manually step up the voltage applied to the CRT to cause the X-ray protection device to operate, the operator may be subject to too much accumulated X-ray radiation if the operator has to continuously test a great number of monitors.

(3) The high voltage that is applied to the CRT to test the X-ray protection device may also cause damage to the parts of the monitor circuit for the circuit is subject to significant electrical stress caused by the high voltage.

(4) In turning on/off the monitor or switching between different operation modes, a transient voltage may be caused which may overshoot and thus is higher than the threshold, causing an unexpected shut-down of the power supply to the CRT. Furthermore, to avoid such a problem, the X-ray protection device may be modified in a conservative to be under-sensitive in order to avoid excessive X-ray radiation.

(5) The X-ray protection device is tested only once in the manufacturing line so that once the parts thereof fail, the device will not work properly.

(6) The variable resistor is subject to aging problem caused by oxidation by the atmosphere.

(7) The performance of the electronic elements of the X-ray protection device is usually affected thermally so that in the actual operation of the monitor, the calibration done in the manufacturing line may not be suitable and an excessive X-ray radiation may occur.

Thus, it is desirable to provide a monitor X-ray protection device which effectively overcomes such problems.

SUMMARY OF THE INVENTION

Therefor, an object of the present invention is to provide an X-ray protection device which overcomes the drawbacks encountered in the prior art by incorporating a microprocessor based circuit therein.

Another object of the present invention is to provide an X-ray protection device which is self-checked so that no manual inspection by stepping up the high voltage supplied to the CRT is needed and thus damage to the operator and the device is reduced.

Another object of the present invention is to provide an X-ray protection device which comprises a microprocessor based circuit serving to continuously detect problems caused by parts aging or defeat.

A further object of the present invention is to provide an X-ray protection device which comprises a microprocessor based circuit which is capable to compensate change of the characteristics of the parts thereof caused by environment or the operation thereof.

A further object of the present invention is to provide an X-ray protection device wherein over sensitivity and under sensitivity are eliminated.

In accordance with the present invention, there is provided an X-ray protection device adapted to be incorporated into a monitor that includes a cathode ray tube actuated by a high voltage from a transformer powered by a low voltage power supply is disclosed. The X-ray protection device includes a circuit which is coupled to a low voltage output of the transformer to obtain a signal from the transformer to represent the high voltage applied by the transformer to the cathode ray tube. The signal is then voltage divided and analog-to-digital-converted to supply a digital signal to a microprocessor which receives and processes the digital signal to give a comparison result by comparing the digital signal with predetermined upper and lower bounds and a triggering threshold and a switching circuit which is connected to the microprocessor to be actuated by the microprocessor in response to the comparison result to cut off the power supplied to the transformer in order to shut down the monitor if the digital signal is not between the upper and lower bounds or is greater than the threshold for a time period greater than a predetermined time interval.

BRIEF DESCRIPTION OF THE DRAWINGS

The present invention will be better understood from the following description of a preferred embodiment thereof, with reference to the attached drawings, wherein:

FIGS. 5 and 6 are flow charts of the operations of the monitor X-ray protection device of the present invention, respectively illustrating the calibration and protection-activating operation of the X-ray protection device.

DETAILED DESCRIPTION OF THE PREFERRED EMBODIMENT

Figure 2:
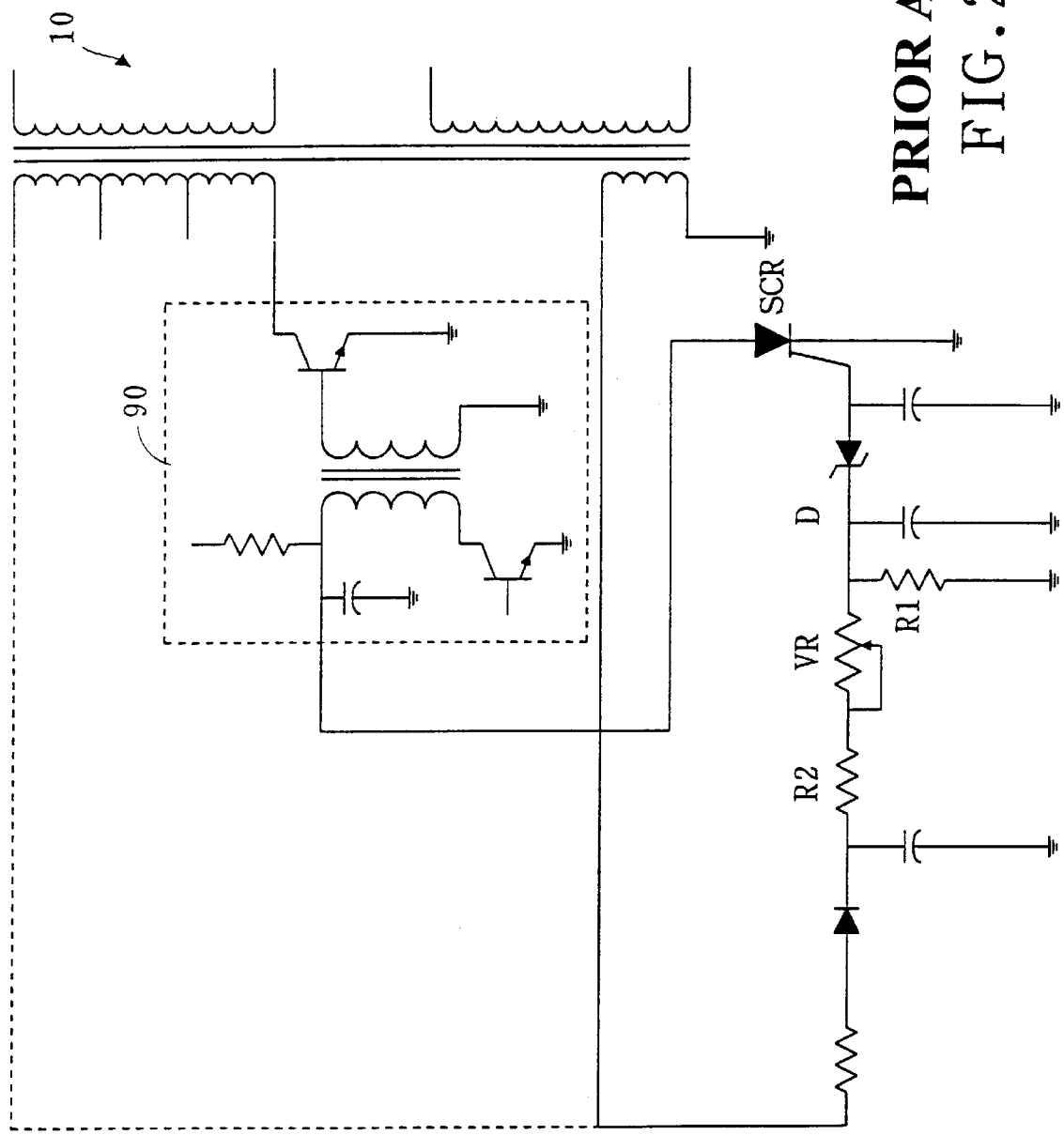
FIG. 2 is a circuit diagram showing a conventional monitor X-ray protection device.
Figure 4:
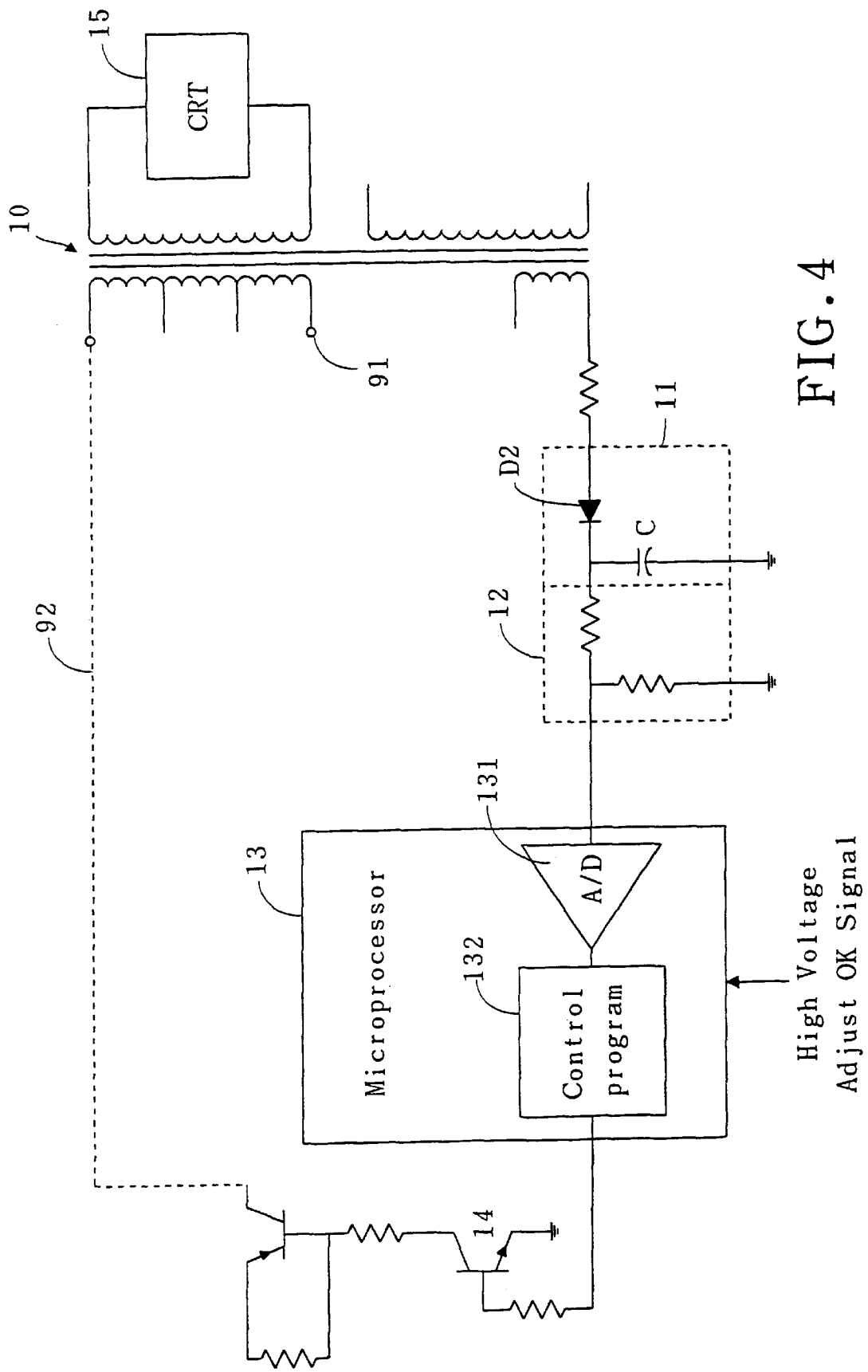
FIG. 4 is a circuit diagram showing a monitor X-ray protection device in accordance with the present invention.

With reference to the drawings and in particular to FIG. 4, wherein a circuit diagram of a monitor X-ray protection device constructed in accordance with the present invention is shown, the monitor X-ray protection device comprises a rectifier circuit 11 which is coupled to a fly back transformer 10 which supplies a high voltage at the secondary side thereof to a monitor CRT 15. A voltage signal that indicates the output voltage at the secondary side of the transformer 10 is obtained at a low voltage output of the transformer 10 and applied to the rectifier circuit 11. As has been discussed with reference to FIG. 2 that shows a conventional X-ray protection device, an alternate current power supply (not shown) is connected to the primary side 91 of the transformer 10 to supply a low voltage AC signal to the transformer 10 which is then transformed into the high voltage supplied to the CRT 15. Since this is known to those skilled in the art, no further detail will be given herein.

Thus, during the operation of the monitor CRT 15, the voltage applied thereto is continuously and repeatedly sampled by the monitor X-ray protection device of the present invention.

The rectifier circuit 11 comprises a diode D2 and a capacitor C to rectify the signal obtained from the transformer 10 and supply a direct current (DC) output. A voltage division circuit 12 is coupled to the rectifier circuit 11 to divide the voltage of the DC output of the rectifier circuit 11 for sampling and provides a sampled signal. The sampled signal is then applied to a microprocessor 13 which may be a commercially available general purpose microprocessor having a built in analog-to-digital (A/D) converter 131 which converts the sampled signal into a digital form to be applied to a central processing unit or a processor of the microprocessor 13.

The central processing unit of the microprocessor 13 operates based on software or control program 132 loaded therein which receives the digital signal from the A/D converter 131 and compares the digital signal with data stored in the microprocessor and a comparison result is obtained.

A switching circuit 14, which may be comprised of transistors or any other electronic elements that are known to perform a switching operation, is connected to and controlled by the microprocessor 13 based on the comparison result obtained in the microprocessor 13. The switching circuit 14 is also connected to the primary side of the transformer 10, as shown by phantom line 92, to form a close loop. Thus, the microprocessor 13 may cut off the power supplied to the primary side of the transformer 10 via the switching circuit 14 based on the comparison result made in the microprocessor 13. Thus, in case that the microprocessor 13 detects and determines an excessive X-ray radiation is occurring, the power supplied to the transformer 10 and thus the CRT 15 is cut off and the CRT 15 is shut down to avoid the over-exposure of X-ray to the computer user.

In accordance with the present invention, the hardware portion of the microprocessor 13 and the switching circuit 14 that connects the microprocessor 13 to the transformer 10 may be those that have already been installed and currently used in a computer monitor for the purpose of power saving which allows the monitor to be shut down once the monitor has been held "idle" (namely the displayed screen of the monitor has been fixed) for a predetermined period of time. The software portion of the microprocessor 13 is modified to include the control program of the present invention in order that the microprocessor may shut down the monitor in both cases that the monitor is idle and that excessive X-ray radiation occurs. This reduces the cost of incorporating the X-ray protection device of the present invention into the monitor.

The control program that is loaded in the microprocessor 13 comprises two portions, a calibration portion as shown in FIG. 5 which is usually done in the monitor manufacture line and a protection-activating portion as shown in FIG. 6 which is usually performed during the practical operation of the monitor for example a user using a computer to which the monitor is coupled.

The calibration portion of the control program comprises a default value of reference voltage level, for example 2.5 V for the 25 KV CRT rating voltage. The "default reference voltage" as used herein is the voltage level that is received at the microprocessor 13 ideally corresponding to the output voltage of the transformer 10 that is substantially at the rating voltage of the CRT 15. The default reference voltage is calculated or obtained on the basis of the ideal characteristics of the electronic elements which is theoretically known or measured in a "standard environment" and assuming no error occurring in the electronic elements. However, due to error inevitably occurring in the electronic parts of the X-ray protection device or due to the change of temperature or humidity, when the output voltage of the transformer 10 is calibrated (in the monitor manufacturing line) to exactly the rating voltage of the CRT 15 (such as 25 KV), the voltage level sensed by the microprocessor 13 may not be exactly the default value. Thus, in accordance with the present invention, to follow the output voltage of the transformer 10 that corresponds to the rating value of the CRT 15, the reference voltage level is changed from the default value to a new value that is read by the microprocessor 13 when the high voltage output of the transformer 10 is calibrated to correspond to the rating voltage of the CRT 15. This ensures that no matter how the characteristics of the electronic elements of the X-ray protection device changes due to for example temperature change or manufacture defeats, the updated reference voltage level always corresponds to the output voltage of the transformer 10 that corresponds to the rating voltage of the CRT 15.

Figure 1:
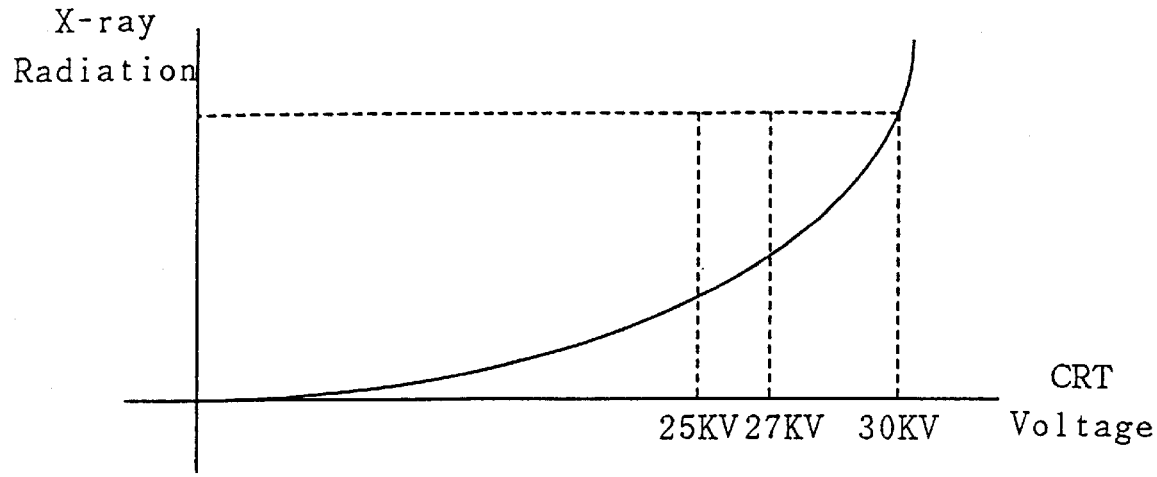
FIG. 1 is a plot showing the relationship between the voltage applied to a monitor CRT and the X-ray radiation from the CRT.
Figure 3:
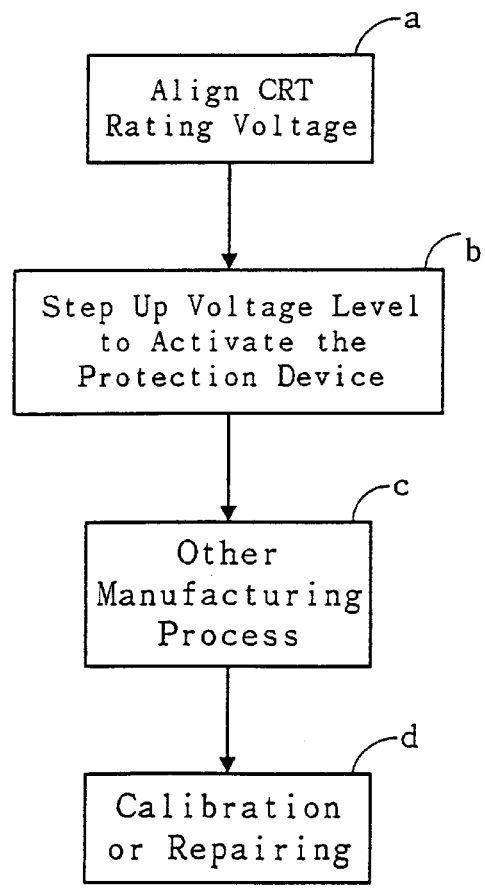
FIG. 3 is a flow chart showing the conventional way of testing the conventional monitor X-ray protection device.

The process of the calibration portion in accordance with the present invention comprises manually applying a signal (high voltage OK signal) that indicates that the output voltage of the transformer 10 has been successfully calibrated to the microprocessor 13 (step 20) after the calibration has been done and then the reference voltage level in the microprocessor 13 (which was the default value) is now updated and replaced by the new value (step 22). Thereafter, in step 24, a triggering voltage level and an upper bound and a lower bound are calculated in the microprocessor based on the following equations:

$$V_t = V_r(1+A\%)$$

$$V_{ub} = V_r + B$$

$$V_{lb} = V_r - C$$

where $V_r$ is the updated reference voltage, $V_t$ the triggering voltage, and $V_{ub}$ and $V_{lb}$ upper and lower bounds. A may be user selected constant between 0 to 100 and in a preferred embodiment of the present invention, A is 10. B is a linear function which increase with high pressure, and B is the same but decrease. For example, As FIG. 1 setting $V_r$=2.5 V, $V_t$=2.75 V, and a monitor's $V_r$ equals to 25 KV and has a detect voltage 2.5 V, when reaching the X-ray act point for protecting, the voltage is 30 KV and has detect voltage 3 V relatively. By this way, $$B = 3\ V - 2.5\ V = 0.5\ V$$

$$V_{ub} = V_r + B = 2.5\ V + 0.5\ V = 3\ V$$

Similarly, If a monitor functions normally with 20 KV voltage, its dectect voltage is 2 V, thus $$C = 2.5\ V - 2\ V = 0.5\ V$$

$$V_{lb} = V_r - C = 2.5\ V - 0.5\ V = 2$$

Wherein A,B are fixed value. A is not always equals to B, it deprnds on the design.

Thereafter, the calibration portion of the control program ends (step 26).

In FIG. 6, the protection activating process is shown. The protection activating process starts at step 30 where the microprocessor 13 is detected and then the microprocessor 30 enters the protection activating process and a voltage signal ($V_d$) from the transformer 10 via the rectifier circuit 11 and the voltage division circuit 12 is read (step 32). In accordance with the present invention, the detection of the microprocessor 13 is performed in a periodical manner. In other words, the microprocessor 13 is detected every predetermined time interval and the protection activating process initiated.

In step 34, power shut-down criterion is tested to see if an excessive X-ray radiation may occur. In accordance with the preferred embodiment of the present invention, the criterion comprises $$(V_d > V_{ub}\ \text{or}\ V_d < V_{lb})\ \text{or}\ (V_d > V_t\ \text{and}\ T_d > T_r)$$

where $T_d$ is the time period when $V_d$ maintains greater than $V_t$ and $T_r$ is a reference time interval pre-defined in the control program. The symbols $V_{ub}$, $V_{lb}$ and $V_t$ were defined hereinbefore.

If the criterion is met, then the microprocessor 13 shut down the CRT 15 by cutting off the power supplied to the transformer 10 by means of the switching circuit 14 (step 36). If the criterion is not met, then the protection-activating process ends (step 38).

The first portion of the criterion given above indicates that if the voltage signal ($V_d$) detected or read by the microprocessor 13 is greater than the upper bound ($V_{ub}$) calculated based on the updated reference voltage given in step 24 of the calibration portion of the control program or the voltage signal ($V_d$) is smaller than the lower bound ($V_{lb}$), both indicating an incorrect operation of the CRT circuit, which may be simply caused by change of the characteristics of the electronic elements of the X-ray protection device due to environmental change or even failure of the electronic element(s), the monitor is shut down. With this criterion, there is no need for the manufacturing line operator to test the X-ray protection device, for if there is any defeat parts included in the X-ray protection device or if there is any reason that causes the voltage to get beyond the desired range, the microprocessor 13 will shut down power supplied to the CRT and thus no excessive X-ray radiation may occur.

The X-ray protection device of the present invention is self-checked.

In accordance with the second portion of the criterion given above, if the voltage ($V_d$) detected by the microprocessor 13 is greater than the triggering voltage ($V_t$) pre-established in step 24 and the condition maintains for a predetermined time period, the microprocessor 13 also shut down the monitor. This criterion prevents the X-ray protection device to be too sensitive to the switching ON/OFF or display mode switching operation of the monitor.

Although the preferred embodiment has been described to illustrate the present invention, it is apparent that changes and modifications in the specifically described embodiment can be carried out without departing from the scope of the present invention which is intended to be limited only by the appended claims.

What is claimed is:

1. An X-ray protection device for a monitor which comprises a cathode ray tube actuated by a high voltage from a transformer powered bv a power supply, said X-ray protection device comprising means for obtaining a signal from the transformer to represent the high voltage applied by the transformer to the cathode ray tube; a microprocessor which receives and processes the signal to give a processing result and a switching circuit which is connected to the microprocessor to be actuated by the microprocessor in response to the processing result to cut off the power supplied to the transformer so as to shut down the cathode ray tube; wherein the means for obtaining a signal from the transformer comprises a rectifier circuit which is coupled to a low voltage output of the transformer and receiving an alternate current signal from the transformer, the alternate current signal being rectified by the rectifier circuit, and a voltage division circuit which divides the rectified signal into an output signal within a predetermined voltage range.

2. The X-ray protection device as claimed in claim 1, wherein an analog-to-digital converter is included between the voltage division circuit and the microprocessor to convert the output signal which is analog form into digital form to be applied to the microprocessor.

3. The X-ray protection device as claimed in claim 2, wherein the processing result is obtain by testing a criterion which comprises comparing the signal applied to the microprocessor with a predetermined upper bound and lower bound and to cut off the power supplied to the transformer if the signal is not located between the upper bound and the lower bound.

4. The X-ray protection device as claim in claim 2, wherein the test result is obtain by testing a criterion which comprises comparing the signal applied to the microprocessor with a pre-established threshold level and to cut off the power supplied to the transformer if the signal is greater than the threshold level for a time period greater than a predefined time interval.

5. A method for preventing a monitor from generating excessive X-ray radiation, said monitor comprising a cathode ray tube powered by a transformer which receives an alternate current power supply and provides a high voltage to the cathode ray tube, and a processor based control circuit being coupled between the power supply and the transformer via a switching circuit, comprising the steps of:

(1) providing a signal representing the high voltage applied to the cathode ray tube to the processor based control circuit;

(2) performing a comparison process by means of the processor of the control circuit to obtain a comparison result; and (3) cutting off the power supplied to the transformer via the switching circuit in response to the comparison result;

wherein the comparison process comprises the steps of (a) comparing the signal with pre-determined upper bound and lower bound and providing the comparison result for cutting off the power supply if the signal is not between the upper and lower bounds and (b) comparing the signal with a predetermined threshold value and providing the comparison result for cutting off the power supply if the signal is greater than the threshold value for a period greater than a predetermined time period.

6. A method for operating an X-ray protection device incorporated in monitor which comprises a transformer powered by a power supply to supply a high voltage for driving a cathode ray tube, the method comprising a calibration process and a protection process performed by a microprocessor based circuit, the calibration process comprising the following steps:

(A) aligning the high voltage supplied to the cathode ray tube to a rating voltage of the cathode ray tube and obtaining a first signal representing the high voltage from the transformer, (B) applying the first signal to the microprocessor, (C) recording the signal as a reference voltage in the microprocessor, and (D) calculating and storing a triggering voltage, an upper bound and a lower bound based on the reference voltage, the triggering voltage being smaller than the upper bound, but greater than the reference voltage which is in turn greater than the lower bound; and the protection process comprising the following steps:

(E) detecting the operation of the monitor, (F) obtaining a second signal from the transformer to represent the high voltage applied to the cathode ray tube, (G) comparing the second signal with the upper and lower bounds and providing a first comparison result, otherwise go to step (I), (H) cutting off the power supplied to the transformer via a switching circuit in response to the first comparison result, (I) comparing the second signal with the triggering voltage and providing a second comparison result if the second signal is greater than the triggering voltage for a period greater than a predetermined time interval, otherwise go to step (K)

(J) cutting off the power supplied to the transformer via a switching circuit in response to the second comparison result, and (K) ending the process.

7. The method as claimed in claim 6, wherein the triggering voltage is 1.1 times of the reference voltage.

8. The method as claimed in claim 6, wherein the upper bound is 1.2 times of the reference voltage and the lower bound is 0.8 times of the reference voltage.

* * * * *